United States Patent
Hama

(10) Patent No.: US 9,054,875 B2
(45) Date of Patent: Jun. 9, 2015

(54) BIOMETRIC AUTHENTICATION APPARATUS, BIOMETRIC AUTHENTICATION METHOD, AND BIOMETRIC AUTHENTICATION COMPUTER PROGRAM

(71) Applicant: FUJITSU LIMITED, Kawasaki-shi, Kanagawa (JP)

(72) Inventor: Soichi Hama, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 21 days.

(21) Appl. No.: 13/919,414

(22) Filed: Jun. 17, 2013

(65) Prior Publication Data

US 2013/0283057 A1 Oct. 24, 2013

Related U.S. Application Data

(63) Continuation of application No. PCT/JP2010/072805, filed on Dec. 17, 2010.

(51) Int. Cl.
*G06F 11/30* (2006.01)
*G06K 9/74* (2006.01)
(Continued)

(52) U.S. Cl.
CPC .......... *H04L 9/3231* (2013.01); *G06K 9/00885* (2013.01)

(58) Field of Classification Search
CPC ............................ H04L 9/3231; G06K 9/00885
USPC .................. 713/186, 165, 166, 167, 168, 170
See application file for complete search history.

(56) References Cited

U.S. PATENT DOCUMENTS

| 5,493,621 A | 2/1996 | Matsumura |
| 7,257,240 B2 * | 8/2007 | Sato et al. ...................... 382/124 |
| 7,542,040 B2 * | 6/2009 | Templeman .................. 345/474 |

(Continued)

FOREIGN PATENT DOCUMENTS

| EP | 2172911 A2 * | 4/2010 | ............... G07C 9/00 |
| JP | 4-109371 | 4/1992 | |

(Continued)

OTHER PUBLICATIONS

International Search Report mailed Jan. 18, 2011 for corresponding International Application No. PCT/JP2010/072805.

(Continued)

*Primary Examiner* — Abu Sholeman
(74) *Attorney, Agent, or Firm* — Staas & Halsey LLP

(57) ABSTRACT

A biometric authentication apparatus includes a biometric information acquiring unit which captures an image of a first body part of a user carrying biometric information to generate a biometric image representing the biometric information, and a processing unit configured to determine a position of a second body part of the user on a position detection image to determine the user's position relative to a reference position, determine a rotation angle corresponding to the user's position based on a relationship between the user's position relative to the reference position and the rotation angle, rotate registered biometric information of a registered user or the biometric information on the biometric image according to the rotation angle so as to make the direction of the registered biometric information substantially parallel to the direction of the biometric information, and compare the registered biometric information and the biometric information to each other.

10 Claims, 9 Drawing Sheets

(51) Int. Cl.
*H04L 9/32* (2006.01)
*G06K 9/00* (2006.01)

(56) References Cited

U.S. PATENT DOCUMENTS

| | | | | |
|---|---|---|---|---|
| 7,809,168 | B2* | 10/2010 | Abiko et al. | 382/115 |
| 7,844,827 | B1* | 11/2010 | Itoi | 713/186 |
| 8,111,882 | B2* | 2/2012 | Mueller | 382/124 |
| 8,320,997 | B2* | 11/2012 | Abe | 600/473 |
| 8,631,243 | B2* | 1/2014 | Baldan et al. | 713/186 |
| 8,699,763 | B2* | 4/2014 | Nada et al. | 382/124 |
| 2004/0101174 | A1* | 5/2004 | Sato et al. | 382/124 |
| 2004/0174337 | A1* | 9/2004 | Kubota et al. | 345/156 |
| 2005/0046576 | A1* | 3/2005 | Julian et al. | 340/573.1 |
| 2007/0047784 | A1 | 3/2007 | Hara | |
| 2007/0143003 | A1* | 6/2007 | Chien | 701/200 |
| 2007/0186106 | A1* | 8/2007 | Ting et al. | 713/168 |
| 2008/0063244 | A1* | 3/2008 | Tanaka et al. | 382/115 |
| 2009/0027351 | A1* | 1/2009 | Zhang et al. | 345/173 |
| 2009/0232362 | A1* | 9/2009 | Otsubo et al. | 382/115 |
| 2009/0282331 | A1* | 11/2009 | Nagasaka | 715/701 |
| 2010/0198078 | A1* | 8/2010 | Abe | 600/473 |
| 2010/0253766 | A1* | 10/2010 | Mann et al. | 348/51 |
| 2012/0142416 | A1* | 6/2012 | Joutras | 463/36 |
| 2012/0308088 | A1* | 12/2012 | Miura et al. | 382/115 |
| 2013/0027184 | A1* | 1/2013 | Endoh | 340/5.83 |
| 2013/0156080 | A1* | 6/2013 | Cheng et al. | 375/222 |
| 2013/0283057 | A1* | 10/2013 | Hama | 713/186 |
| 2013/0287268 | A1* | 10/2013 | Endoh et al. | 382/116 |
| 2013/0300852 | A1* | 11/2013 | Yamamoto | 348/77 |
| 2014/0118519 | A1* | 5/2014 | Sahin | 348/77 |

FOREIGN PATENT DOCUMENTS

| | | |
|---|---|---|
| JP | 7-110860 | 4/1995 |
| JP | 11-306323 | 11/1999 |
| JP | 2000-293688 | 10/2000 |
| JP | 2001-243465 | 9/2001 |
| JP | 2005-149353 | 6/2005 |
| JP | 2007-65900 | 3/2007 |
| JP | 2007-328571 | 12/2007 |
| JP | 2009-3511 | 1/2009 |

OTHER PUBLICATIONS

Office Action mailed Aug. 19, 2014 in corresponding Japanese Patent Application No. 2012-548603.
Japanese Office Action dated Feb. 3, 2015 in corresponding Japanese Patent Application No. 2010-548603.

* cited by examiner

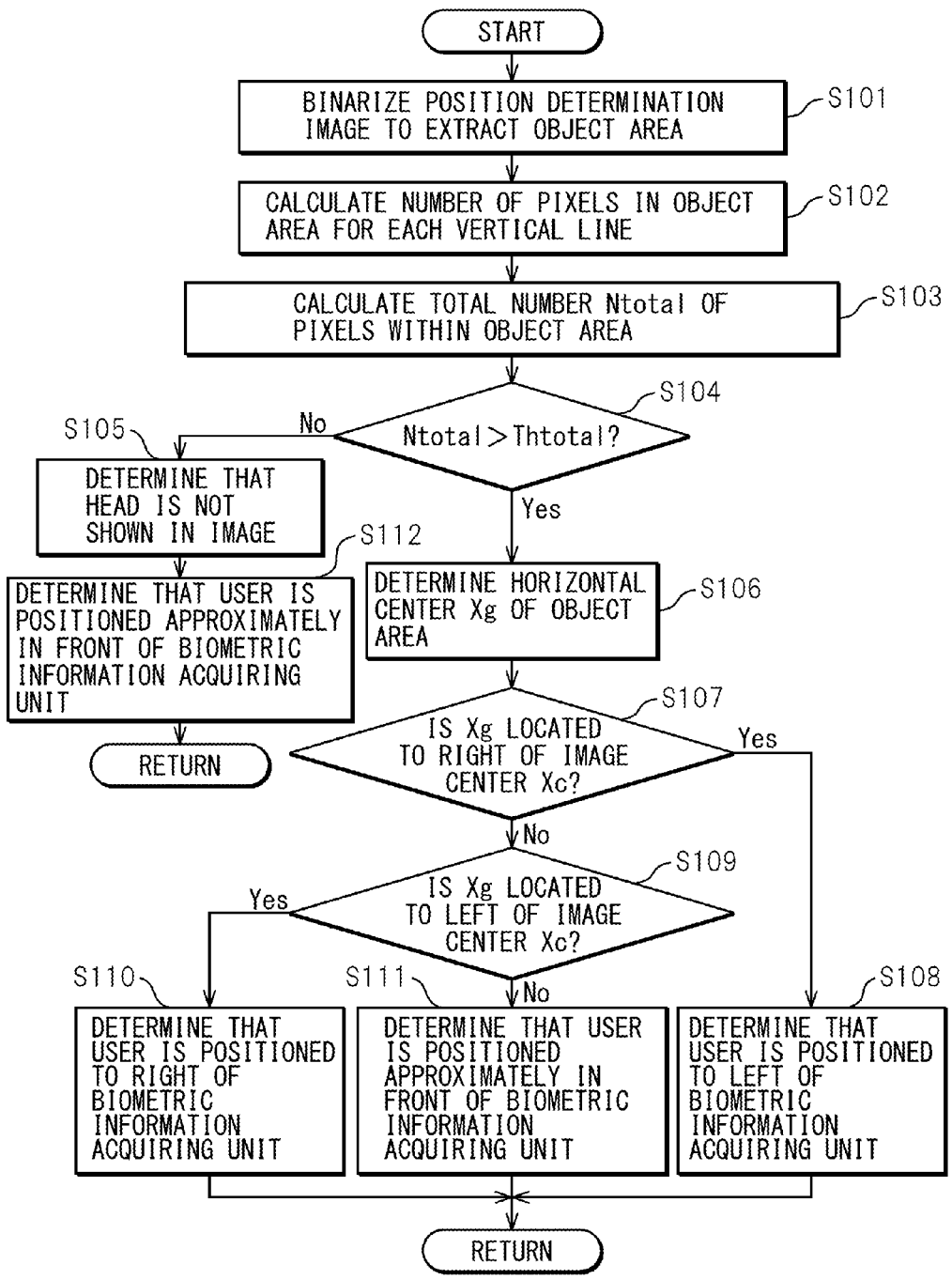

FIG. 6

| USER'S POSITION RELATIVE TO BIOMETRIC INFORMATION ACQUIRING UNIT | ANGLE OBTAINED WHEN USER NATURALLY HOLDS HAND OVER BIOMETRIC INFORMATION ACQUIRING UNIT (CLOCKWISE DIRECTION IS ASSUMED TO BE POSITIVE) | |
|---|---|---|
| | RIGHT HAND | LEFT HAND |
| USER IS POSITIONED TO LEFT OF BIOMETRIC INFORMATION ACQUIRING UNIT | 0° — 601 | 90° |
| | 0° | 0° |
| USER IS POSITIONED TO RIGHT OF BIOMETRIC INFORMATION ACQUIRING UNIT | −90° | 0° |

USER IS POSITIONED APPROXIMATELY AT CENTER OF BIOMETRIC INFORMATION ACQUIRING UNIT

600

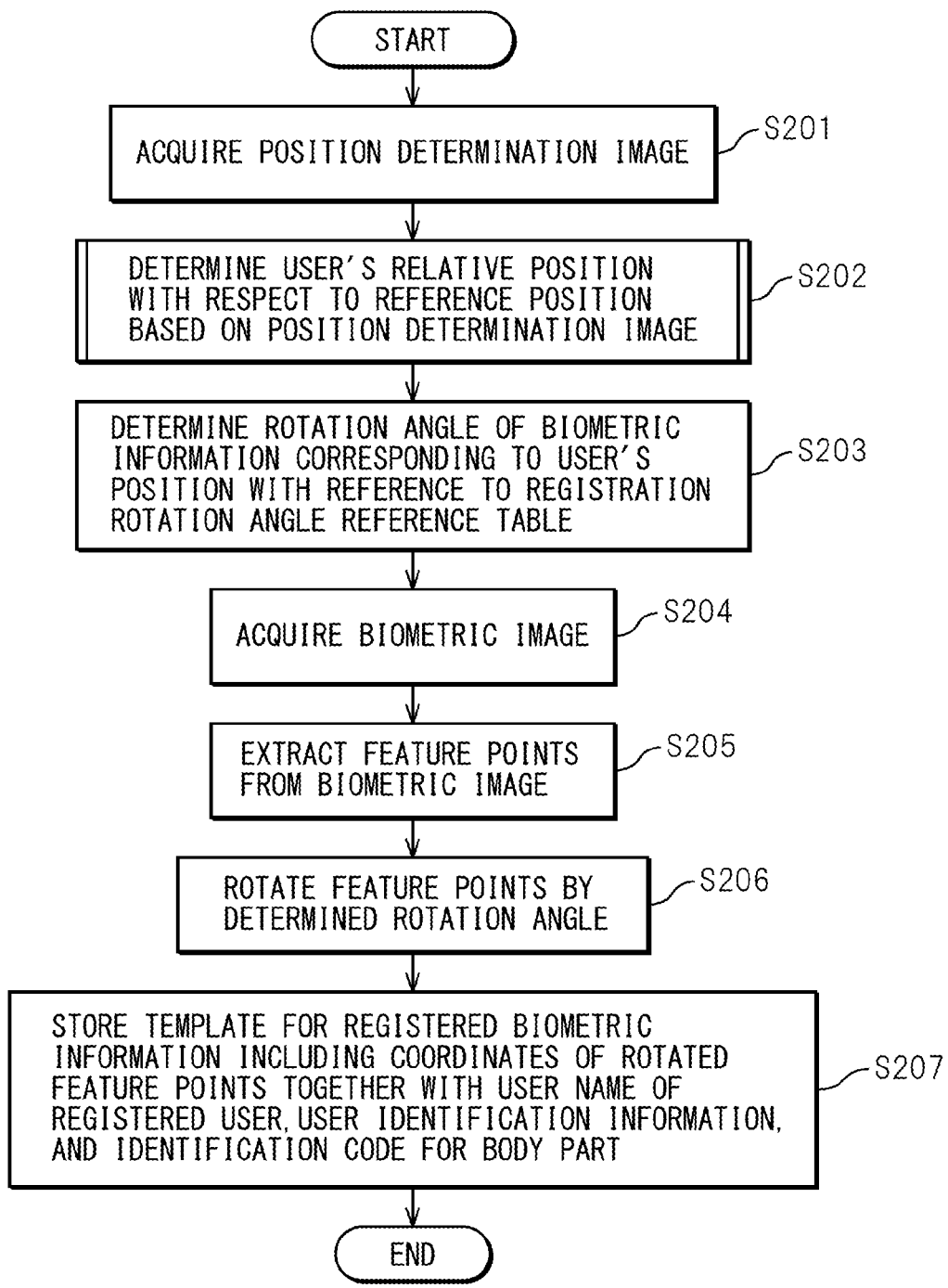

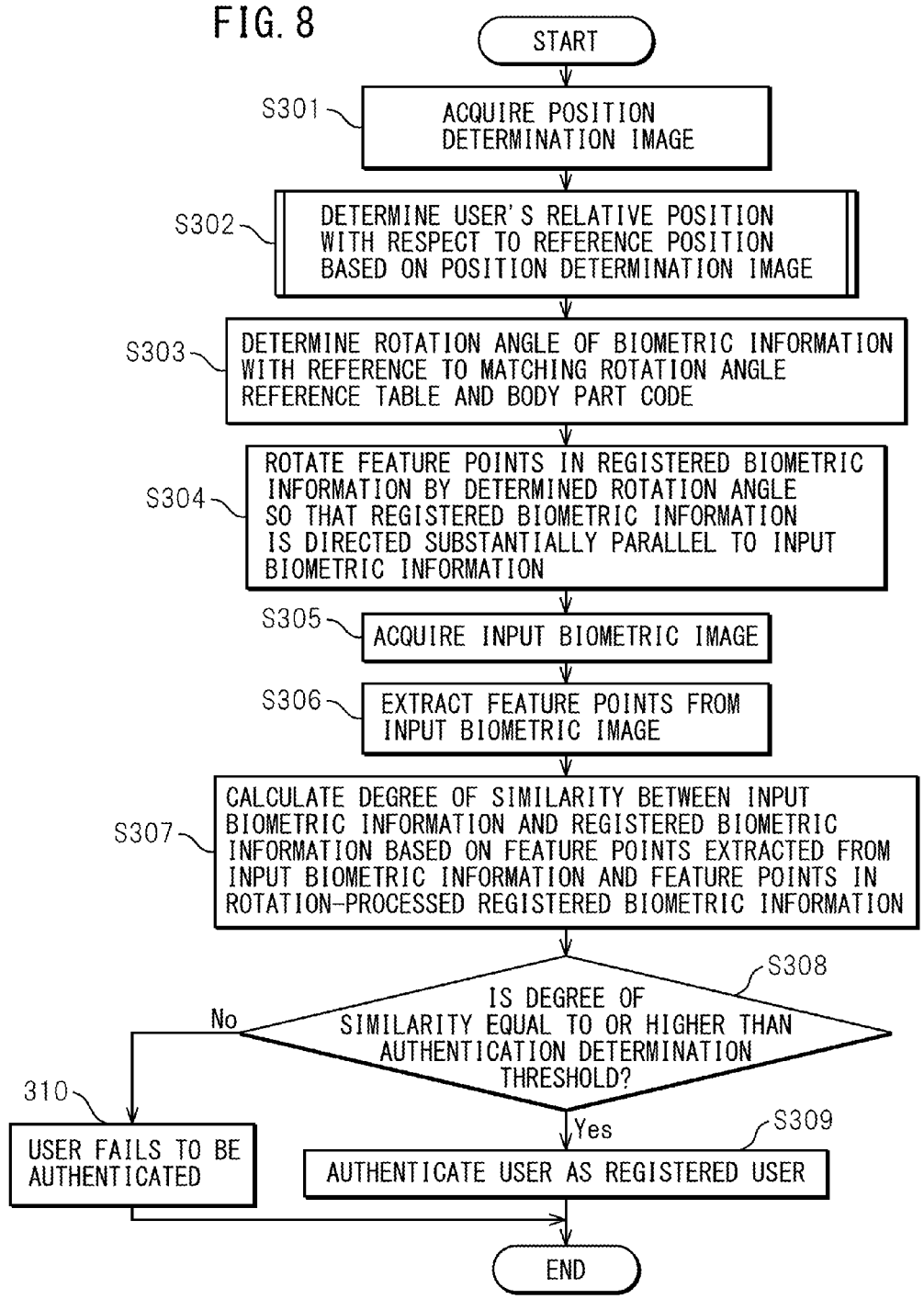

BIOMETRIC AUTHENTICATION APPARATUS, BIOMETRIC AUTHENTICATION METHOD, AND BIOMETRIC AUTHENTICATION COMPUTER PROGRAM

CROSS-REFERENCE TO RELATED APPLICATION

This application is a continuation application and is based upon PCT/JP2010/072805, filed on Dec. 17, 2010, the entire contents of which are incorporated herein by reference.

FIELD

Embodiments discussed herein relate to a biometric authentication apparatus, a biometric authentication method, and a computer program for biometric authentication which carry out biometric authentication using, for example, biometric information presented in the form of a biometric image.

BACKGROUND

Recent years have seen the development of a biometric authentication technique for authenticating a user of an apparatus or a system based on a biometric image representing the user's biometric information such as the user's palm or finger vein pattern or the user's fingerprint or palm print. A biometric authentication device using such a biometric authentication technique acquires, as an input biometric image, a biometric image representing, for example, the biometric information of the user who intends to use the biometric authentication device. Then, the biometric authentication device compares the user's input biometric information represented by the input biometric image with registered biometric information, i.e., biometric information prestored in the form of a biometric image for the corresponding registered user. When the result of the comparison indicates that the input biometric information matches the registered biometric information, the biometric authentication device authenticates the user as being a legitimate registered user. The biometric authentication device then permits the thus authenticated user to use the apparatus in which the biometric authentication device is incorporated or some other apparatus connected to the biometric authentication device.

The direction, at the time of registration, of biometric information relative to a sensor acquiring the image representing biometric information may be different from the direction of the biometric information at the time of matching. Even for the same characteristic structure included in biometric information, the position and direction of the structure on a biometric image acquired at the time of matching is different from the position and direction of the structure on a biometric image acquired at the time of registration when the directions of the biometric information on these images are different from each other. Thus, when matching input biometric information with registered biometric information, the biometric authentication device attempts to find a position where the input biometric information best matches the registered biometric information while rotationally scanning at least one of the image of the biometric information acquired at the time of registration and the image of the biometric information acquired at the time of matching so that the direction of the biometric information acquired at the time of the registration substantially matches the direction of the biometric information acquired at the time of the matching. However, a wide rotation angle range to be scanned increases not only processing time but also the probability (referred to as a false acceptance rate) that, even when a user carrying input biometric information is different from a registered user registered biometric information, the biometric authentication device mistakenly authenticates the user as the legitimate registered user. Thus, for example, the biometric authentication device is operated such that an allowable range is preset for angular difference between the direction of the biometric information acquired at the time of the registration and the direction of the biometric information acquired at the time of the matching, and that a body part carrying the biometric information is held over the sensor so that the angular difference falls within the allowable range.

However, when the sensor is fixedly installed, for example, when the sensor is installed in an automated teller machine or into a palm rest unit of a notebook personal computer, the sensor is located, for example, at a right end or a left end of such apparatus. This is because, in such an apparatus, a display device or an input device such as a keyboard or a touch-pad, which is a main user interface, is located in a central portion of the apparatus for the user's convenience and because the end of the apparatus is the only place where the a sensor for biometric information input can be located.

When the sensor is located at the right end or left end of the apparatus and the user holds a body part located closer to the sensor, for example, the user's right hand, which is closer to the sensor located at the right end, over the sensor in a natural posture, the direction of the body part is substantially parallel to a vertical direction of the sensor (i.e., the direction from the near side to the far side). On the other hand, when the user holds a body part located farther from the sensor, for example, the user's left hand, which is farther from the sensor located at the right end, over the sensor in a natural posture, the direction of the body part is rotated through about 90° from the vertical direction of the sensor. Thus, the angular difference between the direction of the body part and the direction of the sensor may deviate from the set allowable range, the user may not be authenticated. Furthermore, when the user holds the body part located farther from the sensor over the sensor in an unnatural posture so as to make the direction of the body part substantially parallel to the vertical direction of the sensor, the body part may be twisted or significantly tilted in any direction to the sensor. In such a case, the biometric information captured on the biometric image is distorted. Therefore when such a biometric image is used for a biometric authentication process, authentication accuracy may decrease.

Thus, various techniques have been proposed to solve the problems as described above (see, for example, Japanese Laid-open Patent Publication No. 2007-65900, Japanese Laid-open Patent Publication No. 2001-243465, and Japanese Laid-open Patent Publication No. H7-110860).

In an example of such known techniques, a rotation mechanism is provided in a coupling unit between a biometric authentication device and an automatic dealing device. When a user operates the biometric authentication device, the rotation device rotates the biometric authentication device so that the user can easily use the biometric authentication device.

Furthermore, in another example of the known techniques, a palm position detecting device detects the lateral direction and the left, right, top and bottom ends of the palm in an image of the palm side of the hand to detect the position of the palm in the image, and rotates the image based on the lateral direction of the palm so as to allow coordinates to be detected.

In yet another example of the known techniques, a biometric information authentication system prestores biometric information on each registered user and corresponding angle information. The biometric information authentication system utilizes the angle information to judge whether or not read biometric information matches the stored biometric information.

SUMMARY

However, when a sensor reading biometric information is of a noncontact type, it is difficult to rotate the sensor according to direction of a body part carrying the biometric information. Furthermore, when the sensor is mounted in a small-sized apparatus such as a notebook personal computer, it is also difficult to secure sufficient space for the rotation mechanism to be mounted.

Additionally, only a part of the palm may be captured on the image depending on the positional relationship between the sensor and the palm and the maximum angle of view of the sensor. In such a case, it is difficult for the biometric authentication device to accurately determine the lateral direction of the palm simply based on only the image. This may preclude accurate determination of the direction of the palm relative to the sensor.

Moreover, the technique using angle information stored at the time of registration assumes that the user memorizes the angle information. Thus, when the user fails to remember the angle information at the time of matching, the biometric authentication device cannot authenticate the user as the legitimate registered user. This may be inconvenient to the user.

According to one embodiment, a biometric authentication apparatus is provided. The biometric authentication apparatus includes a biometric information acquiring unit which captures a first body part of a user carrying biometric information to generate a biometric image representing the biometric information, a storage unit which stores a reference table representing a relationship between user's position relative to a predetermined reference position and a rotation angle of the biometric information, and a template for registered biometric information of each registered user, and a processing unit which compares the biometric information represented on the biometric image with the registered biometric information. The processing unit implements a position determining function to determine a position of a second body part of the user different from the first body part on a position detection image in which the second body part is captured to determine the user's position relative to the predetermined reference position, a rotation amount estimating function to determine the rotation angle corresponding to the user's position with reference to the reference table, a rotating function to rotate the registered biometric information or the biometric information on the biometric image according to the rotation angle to direct the registered biometric information substantially parallel to the biometric information on the biometric image, and a matching function to compare the registered biometric information and the biometric information to each other, the direction of the registered biometric information and the direction of the biometric information having been made substantially parallel to each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 is a diagram depicting an operational flowchart of a position detecting process controlled by a computer program executed on the processing unit.

FIG. 6 is a table representing the angle of the direction of a body part carrying biometric information relative to a vertical direction of the biometric information acquiring unit when the body part is naturally held over the biometric authentication apparatus.

FIG. 7 is a diagram depicting an operational flowchart of a biometric information registering process controlled by the computer program executed on the processing unit.

FIG. 8 is a diagram depicting an operational flowchart of a biometric information process controlled by the computer program executed on the processing unit.

DESCRIPTION OF EMBODIMENTS

Biometric authentication apparatuses according to various embodiments will be explained below with reference to the drawings.

The biometric authentication apparatus acquires a biometric image that is an image representing biometric information of a user in order to carry out a biometric authentication process for the user. The biometric authentication apparatus generates an image representing the user's head by a sensor which reads the biometric information, detects the position of the user's head on the image, and thus detects the user's position relative to a predetermined reference position. Depending on the user's position and a registered body part, the image of the biometric authentication apparatus then estimates the direction of the biometric information carried by the body part relative to the sensor.

According to the present embodiment, the biometric authentication apparatus utilizes a hand vein pattern as the biometric information intended for a biometric authentication. However, the biometric information intended for the biometric authentication may be another type of biometric information represented in a still image such as a fingerprint, a palm print, a nose pattern, or a palm shape.

Moreover, according to the present embodiment, the biometric authentication apparatus is incorporated into a personal computer. However, the biometric authentication apparatus may be mounted in various apparatuses such as an automatic teller machine or an input apparatus for entry and exit admittance which include a fixedly installed sensor which reads the biometric information and in which the result of biometric authentication is utilized.

Furthermore, the term "matching process" is used to refer to the process for computing the degree of similarity between the input biometric information and the registered biometric information. Further, the term "biometric authentication process" is used to refer to the entire authentication process which includes not only the matching process but also the process for determining whether the user is an authenticated user or not based on the result of the matching process.

Figure 1:
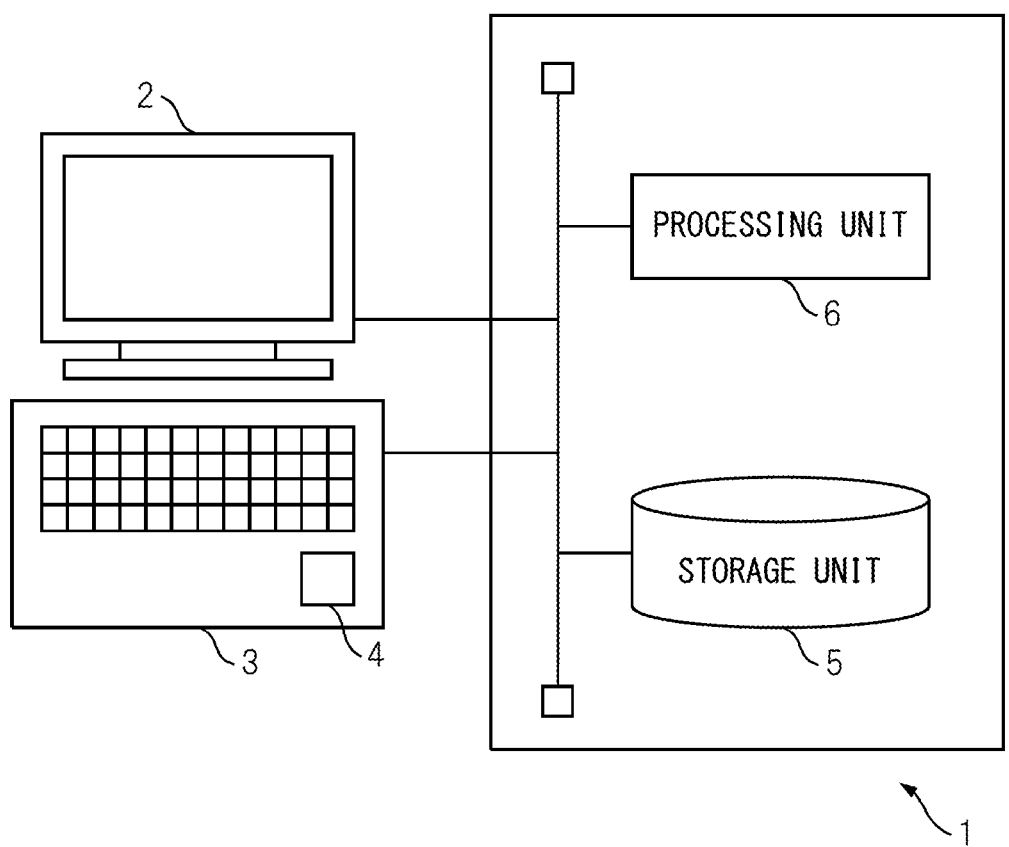
FIG. 1 is a diagram schematically depicting a configuration of a biometric authentication apparatus according to a first embodiment.

FIG. 1 is a diagram schematically depicting the configuration of the biometric authentication apparatus according to a first embodiment. As depicted in FIG. 1, the biometric authentication apparatus 1 includes a display unit 2, an input unit 3, a biometric information acquiring unit 4, a storage unit 5, and a processing unit 6. The display unit 2, the input unit 3, and the biometric information acquiring unit 4 may be provided separately from a housing in which the storage unit 5 and the processing unit 6 are accommodated. Alternatively, the display unit 2, the input unit 3, the biometric information acquiring unit 4, the storage unit 5, and the processing unit 6 may be accommodated in a single housing as in the case of what is called a notebook personal computer or a tablet terminal.

The biometric authentication apparatus 1 generates a biometric image representing a user's hand vein pattern by the biometric information acquiring unit 4 and carries out a biometric authentication process using the biometric image. When the biometric authentication apparatus 1 has authenticated the user as any registered user as a result of the biometric authentication process, the biometric authentication apparatus 1 permits the user to use a computer in which the biometric authentication apparatus 1 is implemented. Alternatively, the biometric authentication apparatus 1 transmits a signal indicating that the user has been authenticated to another apparatus (not depicted) to permit the user to use the other apparatus.

The display unit 2 includes a display device such as a liquid crystal display or a CRT monitor. The display unit 2 displays, to the user, a message indicating a body part (right head or left hand) which is used for the matching or a guidance message for directing the user to place the user's hand on the position where the biometric information acquiring unit 4 can acquire an appropriate biometric image. The display unit 2 also displays various types of information items related to applications executed by the processing unit 6.

The input unit 3 includes, for example, a keyboard and a palm rest unit provided in front of the keyboard. The input unit 3 may further include a keypad substantially in the center of the palm rest unit. Commands, data, and the user's name or password are passed to the processing unit 6.

The biometric information acquiring unit 4 generates the biometric image representing the user's hand vein pattern. To achieve this, the biometric information acquiring unit 4 includes, for example, a two-dimensionally arranged imaging element array and an optical system. According to the present embodiment, the optical system forms an image of an object located within a predetermined distance range from a surface of the biometric information acquiring unit 4, on the imaging element array so that the vein pattern is captured in the biometric image even when the user does not touch the biometric information acquiring unit 4 by hand. Furthermore, the optical system can project, on the imaging array, a defocused image containing another object positioned out of the predetermined distance range, for example, the user's head. Moreover, the biometric information acquiring unit 4 may include an illumination light source such as an infrared light emitting diode for illuminating the user's hand.

According to the present embodiment, the biometric information acquiring unit 4 is formed integrally with the input unit 3 and located near a right end of the palm rest unit of the input unit 3. However, the disposition of the biometric information acquiring unit 4 is not limited to this example. For example, the biometric information acquiring unit 4 may be located near a left end of the palm rest unit.

Figures 2A, 2B:
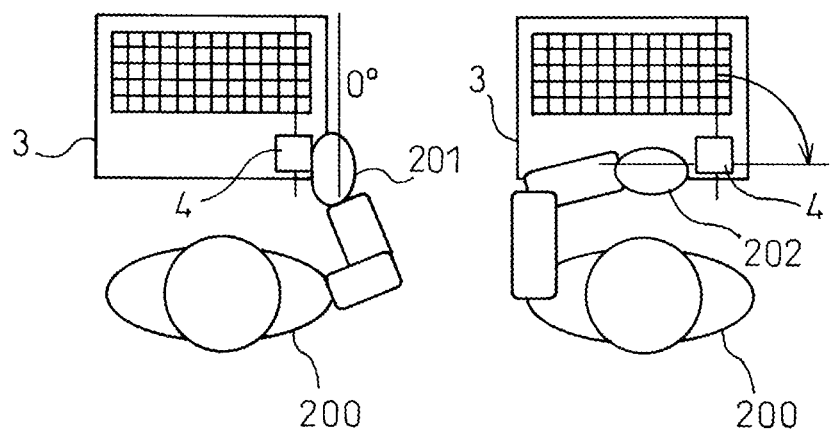
FIG. 2A and FIG. 2B are diagrams depicting examples of a positional relationship between a user and a biometric information acquiring unit.

FIG. 2A and FIG. 2B are diagrams depicting examples of the positional relationship between the user and the biometric information acquiring unit 4. FIG. 2A depicts the positional relationship between a body part carrying the biometric information and the biometric information acquiring unit when the body part is the user's right hand. FIG. 2B depicts the positional relationship between a body part carrying the biometric information and the biometric information acquiring unit when the body part is the user's left hand.

As depicted in FIG. 2A and FIG. 2B, a user 200 is normally positioned in front of the input unit 3 so as to be able to utilize the input unit 3 with both hands. On the other hand, in the present embodiment, the biometric information acquiring unit 4 is located near the right end of the palm rest unit of the input unit 3. Thus, as depicted in FIG. 2A, the vertical direction of the biometric information acquiring unit 4 (i.e., the direction from the near side to the far side) is substantially parallel to a longitudinal direction of a right hand 201 of the user 200. On the other hand, as depicted in FIG. 2B, the user 200 needs to hold the left hand 202 over the biometric information acquiring unit 4 so that the user's left arm extends across the front of the body of the user 200. Thus, the vertical direction of the biometric information acquiring unit 4 is substantially orthogonal to the longitudinal direction of the left hand 202 of the user 200. As illustrated above, the user can hold a body part positioned close to the biometric information acquiring unit 4 over the biometric information acquiring unit 4 so as to make the direction of the biometric information involved in the body part substantially parallel to the vertical direction of the biometric information acquiring unit 4. However, the user can more easily hold a body part positioned away from the biometric information acquiring unit 4 over the biometric information acquiring unit 4 so as to place the body part in a direction different from the vertical direction of the biometric information acquiring unit 4. Therefore, the biometric authentication apparatus 1 can estimate the direction of the biometric information on the biometric image according to the positional relationship between the biometric information acquiring unit 4 and the user.

Thus, according to the present embodiment, the biometric information acquiring unit 4 generates, in addition to the biometric image, a position determination image at the time of matching or registration before the biometric image is acquired, for example, during a predetermined period from the display of a guidance message until the biometric image is generated. The position determination image is utilized to determine the relative positional relationship between the biometric information acquiring unit 4 and the user and is an image on which a defocused image of the user's head is captured. The biometric information acquiring unit 4 may generate a plurality of position determination images during a predetermined period. The biometric information acquiring unit 4 passes the generated biometric image and the position determination image to the processing unit 6. The biometric information acquiring unit 4 generates the biometric image and the position determination image so that a direction from the near side of the input unit 3 (side closer to the user) toward the far side of the input unit 3, i.e., the vertical direction of the biometric information acquiring unit 4 is equal to a vertical direction on the image.

The storage unit 5 includes at least one device, for example, among a semiconductor memory device, a magnetic disk device, and an optical disk device. The storage unit 5 stores an application program to be used in the biometric information processing apparatus 1, the user name, the identification number and personal setting information of at least one registered user, and various kinds of data. The storage unit 5 further stores a program for carrying out the biometric authentication process. Moreover, the storage unit 5 stores for each registered user, a template for a vein pattern of either the right or left hand which is the registered biometric information of the registered user. The template for the registered biometric information includes, as features for matching, the positions or types of feature points representing a characteristic structure such as ending or bifurcation points of the vein extracted from the registered biometric image that is an image representing the registered biometric information. Alternatively, the template for the registered biometric information may be the registered biometric image itself or a part of the registered biometric image.

The processing unit 6 includes one or more processors and their peripheral circuitry. The processing unit 6 carries out the biometric authentication process by using the biometric image representing the biometric information of the user which is acquired from the biometric information acquiring unit 4. Furthermore, the processing unit 6 also carries out a biometric information registering process for registering the biometric information on the registered user.

Figure 3:
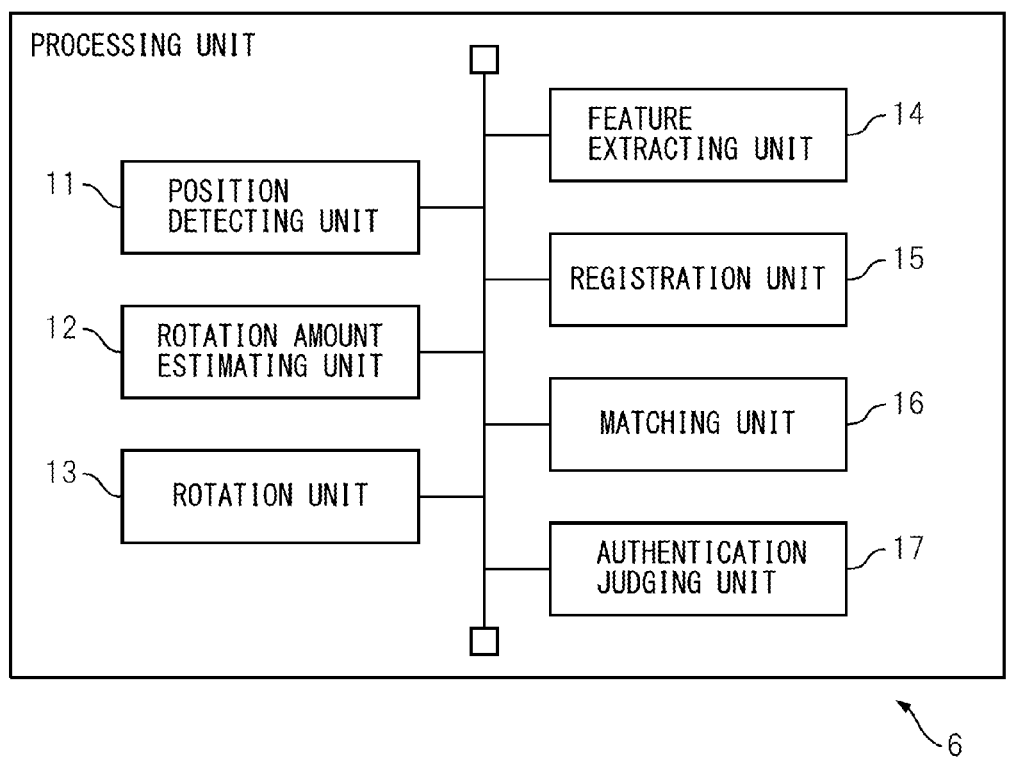
FIG. 3 is a functional block diagram of a processing unit provided in the biometric authentication apparatus.

FIG. 3 is a functional block diagram of the processing unit 6. As depicted in FIG. 3, the processing unit 6 includes a position detecting unit 11, a rotation amount estimating unit 12, a rotation unit 13, a feature extracting unit 14, a registration unit 15, a matching unit 16, and an authentication judging unit 17. These units constituting the processing unit 6 are functional modules implemented by executing a computer program on the processor incorporated in the processing unit 6. Alternatively, these units constituting the processing unit 6 may be implemented as firmware on the biometric information processing apparatus 1.

The position detecting unit 11 detects the position of the user's head on the position determination image to obtain a relative position of the user to the predetermined reference position.

The user is closer to the biometric information acquiring unit 4 than an object behind the user. Thus, the biometric information acquiring unit 4 can detect the illumination light emitted by the illumination light source of the biometric information acquiring unit 4 and reflected by the user. On the other hand, the biometric information acquiring unit 4 detects approximately none of the illumination light reflected by the object behind the user. As a result in the position detection image, each pixel contained in an object area of in which the user is captured has a higher luminance than each pixel contained in a background area of in which the user is not captured. Thus, in the present embodiment, the position detection unit 11 binarizes the position detection image to detect the object area, and determines the horizontal center of the object area to determine the user's position relative to the predetermined reference position. The predetermined reference position may be any position where a positional relation with the biometric information acquiring unit 4 is fixedly determined. For example, the predetermined reference position may be set at the center of or either right or left end of the imaging element array of the biometric information acquiring unit 4 or the horizontal center of the input unit 3 or either right or left end of the input unit 3. The present embodiment sets the predetermined reference position at the horizontal center of the imaging element array of the biometric information acquiring unit 4.

Figure 4A:
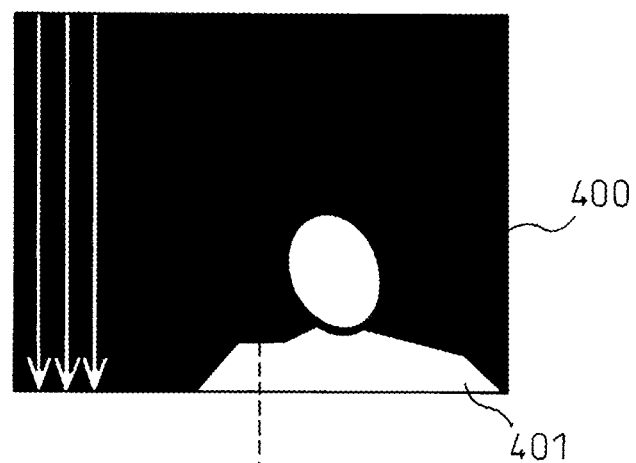
FIG. 4A is a diagram depicting an example of a position determination image.
Figure 4B:
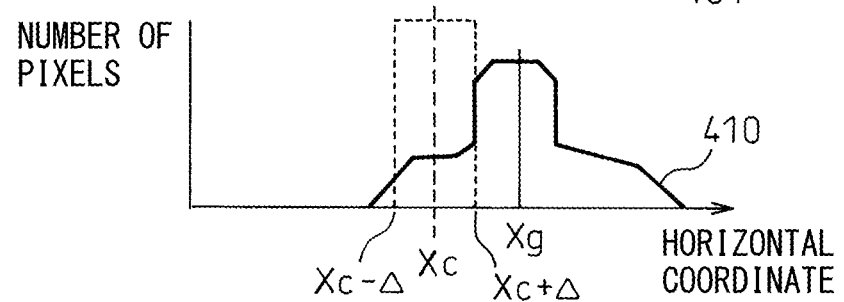
FIG. 4B is a histogram depicting the accumulated number of pixels in which the user is captured in each vertical line in the position determination image depicted in FIG. 4A.

FIG. 4A is a diagram depicting an example of the position determination image. FIG. 4B is a histogram depicting the total number of pixels in which the user is captured in each vertical line in the position determination image depicted in FIG. 4A. In FIG. 4B, the axis of abscissas indicates a horizontal coordinate, and the axis of ordinate indicates the number of pixels.

In a position determination image 400 depicted in FIG. 4A, an object area 401 represents a defocused image of the user's upper body. As depicted in FIG. 4B, a histogram 410 indicates that the number of pixels in a portion corresponding to the head is largest, and the number of pixels capturing an image of the user's upper body decreases with increasing distance from the head. Thus, the horizontal center Xg of the area 401 serves as an indicator representing the position of the user's head. The center Xg is located at a distance not less than an offset Δ to the right from the center Xc of the image. Therefore, the user is positioned, when viewed from the biometric information acquiring unit 4, to the right from the center of the imaging element array, i.e., to the left of the biometric information acquiring unit 4 and closer to the center of the input unit 3.

FIG. 5 is a diagram depicting an operational flowchart of a position detecting process controlled by the computer program executed on the processing unit.

The position detecting unit 11 binarizes the position determination image using a predetermined threshold value (step S101). The predetermined threshold value is set to be smaller than the luminance value of each of the pixels in the object area in which the user is captured and to be larger than the luminance value of each of the pixels in the background area. For example, the predetermined threshold value may be experimentally set or may be an averaged luminance value for the position determination image. The position detecting unit 11 compares the luminance value of each of the pixels in the position determination image with a predetermined threshold value, and binarizes the image so that each pixel with a luminance value equal to or larger than the threshold value to be a certain value, and each pixel with a luminance value smaller than the threshold value to be a different value. Thus, in the binarized position determination image, the pixels in the object area have values different from the values for the pixels in the background area.

Then, the position detecting unit 11 determines the number of pixels in each vertical line in the object area to generate the histogram representing the total number of pixels in which the user is captured in each vertical line (step S102). The position detecting unit 11 sums the numbers of pixels in all lines to calculate the total number Ntotal of pixels in the object area (step S103).

The position detecting unit 11 judges whether or not the total number Ntotal is larger than a threshold value Ttotal for the number of effective pixels (step S104). When the total number Ntotal is equal to or smaller than the threshold value Ttotal for the number of effective pixels (step S104—No), the position detecting unit 11 judges that the user's head is not captured in the position determination image (step S105). In this case, the user is estimated to be positioned away from the biometric information acquiring unit 4. When the user is positioned away from the biometric information acquiring unit 4, the user can place either the right hand or the left hand so that the longitudinal direction of the hand (i.e., the direction from the wrist side toward the fingertips) is substantially parallel to the vertical direction of the biometric information acquiring unit 4, as is the case in which the user is positioned in front of the biometric information acquiring unit 4. Therefore, the position detecting unit 11 judges that the user is positioned approximately in front of the biometric information acquiring unit 4 (step S112). Subsequently, the position detecting unit 11 terminates the position detecting process. Note that the threshold value Ttotal is set equal to the number of pixels contained in the image of the head expected when the user's head is wholly captured in the position determination image, for example, is set to 20% of the number of all pixels in the position determination image.

On the other hand, when the total number Ntotal is larger than the threshold value Ttotal for the number of effective pixels (step S104—Yes), the position detecting unit 11 judges that the user's head is captured in the position determination image. The position detecting unit 11 determines the horizontal center Xg in the object area based on the histogram (step S106).

The position detecting unit 11 judges whether or not the center Xg is located at a distance not less than the predetermined offset Δ to the right from an image center Xc representing a reference position, i.e., whether or not Xg is larger than (Xc+Δ) (step S107). When the center Xg is located to the right of a position (Xc+Δ) (step S107—Yes), the position detecting unit 11 judges that the user is positioned to the left of the biometric information acquiring unit 4 (step S108).

On the other hand, when the center Xg is not located to the right of the position (Xc+Δ) (step S107—No), the position detecting unit 11 judges whether or not the center Xg is located at a distance not less than a predetermined offset Δ to the left from the image center Xc, i.e., whether or not the value Xg is less than the value (Xc−Δ) (step S109). When the center Xg is located to the left of the position (Xc−Δ) (step S109—Yes), the position detecting unit 11 judges that the user is positioned to the right of the biometric information acquiring unit 4 (step S110).

On the other hand, when the center Xg is not located to the left of the position (Xc−Δ) (step S109—No), the position detecting unit 11 judges that the user is positioned approximately in front of the biometric information acquiring unit 4 (step S111). Note that the offset Δ is set according to the angle of view of the optical system provided in the biometric information acquiring unit 4 and the expected distance between the biometric information acquiring unit 4 and the user. For example, the offset Δ is set to 10% of the horizontal width of the position determination image.

After the step S108, S110, or S111, the position detecting unit 11 notifies the rotation amount estimating unit 12 of the result of position detection for the user. Subsequently, the position detecting unit 11 terminates the position detecting process.

The rotation amount estimating unit 12 determines a rotation angle needed to align the direction of the biometric information captured in the biometric image with a particular direction, with reference to the result of position detection for the user and a rotation angle reference table stored in the storage unit 5. The direction of the biometric information referred in the present embodiment may represent any direction of the biometric information and may be arbitrarily preset. According to the present embodiment, the direction of the biometric information is from the wrist side toward the fingertips.

FIG. 6 is a diagram depicting a table representing the angle of direction of the biometric information relative to the vertical direction of the biometric information acquiring unit 4 observed when the body part carrying the biometric information is naturally held over the biometric information acquiring unit 4. In a table 600, a left end column represents the user's position relative to the biometric information acquiring unit 4. A central column represents the rotation angle of the direction of the biometric information (in this example, the direction from the wrist toward the fingertips) relative to the vertical direction of the biometric information acquiring unit 4 observed when the body part carrying the biometric information is the right hand. Furthermore, a right end column represents the rotation angle of the direction of the biometric information relative to the vertical direction of the biometric information acquiring unit 4 observed when the body part carrying the biometric information is the left hand. Note that the rotation angle is expressed by assuming the clockwise direction to be positive.

As depicted in the table 600, when a user 601 is positioned to the left of the biometric information acquiring unit 4 and holds the user's right hand over the biometric information acquiring unit 4, or when the user 601 is positioned to the right of the biometric information acquiring unit 4 and holds the user's left hand over the biometric information acquiring unit 4, the rotation angle is 0°. Furthermore, when the user is positioned approximately in front of the biometric information acquiring unit 4, the user can hold either the user's right hand or left hand over the biometric information acquiring unit 4 so as to make the direction of the hand substantially parallel to the vertical direction of the biometric information acquiring unit 4. Thus, the rotation angle is 0°. On the other hand, when the user 601 is positioned to the left of the biometric information acquiring unit 4 and holds the user's left hand over the biometric information acquiring unit 4, the user 601 needs to hold the user's left hand over the biometric information acquiring unit 4 so that the user's left arm extends across the front side of the user's body. Thus, the rotation angle is about 90°. Similarly, when the user 601 is positioned to the right of the biometric information acquiring unit 4 and holds the user's right hand over the biometric information acquiring unit 4, the user 601 needs to hold the user's right hand over the biometric information acquiring unit 4 so that the user's right arm extends across the front side of the user's body. Thus, the rotation angle is about −90°.

According to the present embodiment, to facilitate management of the biometric information when the biometric information is registered, the rotation amount estimating unit 12 determines the rotation angle through which the biometric image or feature points in the biometric information extracted from the biometric image is rotated so as to align the direction of the biometric information with the vertical direction on the biometric image, regardless of the user's position at the time of registration.

For example, the rotation amount estimating unit 12 determines the rotation angle corresponding to the body part carrying the biometric information held over the biometric information acquiring unit 4 and to the user's position, with reference to a registration rotation angle reference table depicted below. In this example, the rotation angle is determined so as to align the direction of the biometric information with the vertical direction on the biometric image, i.e., so that, the biometric image corresponds to an image captured in a state in which the vertical direction of the biometric information acquiring unit 4 is substantially parallel to the direction of the biometric information.

TABLE 1

Registration rotation angle reference table

| User's position | Rotation angle (clockwise direction is assumed to be positive) | |
| --- | --- | --- |
| | Right hand | Left hand |
| To left | 0° | Rotation though −90° |
| Approximate center | 0° | 0° |
| To right | Rotation though +90° | 0° |

A left end column in Table 1 represents the user's position relative to the biometric information acquiring unit 4. A central column represents the rotation angle when the body part carrying the biometric information is the right hand. A right end column represents the rotation angle when the body part carrying the biometric information is the left hand. The rotation angle is expressed by assuming the clockwise direction to be positive. For example, when the user is positioned to the right of the biometric information acquiring unit 4 and the body part captured in the biometric image is the right hand, the right hand is rotated through −90° from the vertical direction of the biometric information acquiring unit 4, as described above. Thus, the rotation angle is set to +90°.

Furthermore, the rotation amount estimating unit 12 determines the rotation angle of the registered biometric information for aligning the direction of the registered biometric information with the direction of the biometric information on the biometric image acquired at the time of matching, regardless of the user's position at the time of matching.

For example, the rotation amount estimating unit 12 determines the rotation angle corresponding to the body part carrying the biometric information held over the biometric information acquiring unit 4 and the user's position, with reference to a matching rotation angle reference table depicted below. Note that the body part carrying the biometric information may be preliminarily designated by the biometric authentication apparatus 1 or by the user via the input unit 3.

TABLE 2

Matching rotation angle reference table

| User's position | Rotation angle (clockwise direction is assumed to be positive) | |
|---|---|---|
| | Right hand | Left hand |
| To left | 0° | Rotation though +90° |
| Approximate center | 0° | 0° |
| To right | Rotation though −90° | 0° |

A left end column in Table 2 represents the user's position relative to the biometric information acquiring unit 4. A central column represents the rotation angle when the body part carrying the biometric information is the right hand. A right end column represents the rotation angle when the body part carrying the biometric information is the left hand. The rotation angle is expressed by assuming the clockwise direction to be positive. For example, when the user is positioned to the right of the biometric information acquiring unit 4 and the body part captured in the biometric image is the right hand, the rotation angle is set to −90°.

Furthermore, the rotation amount estimating unit 12 may determine, even at the time of matching, the rotation angle of the biometric information on the input biometric image so that the direction of the body part carrying the biometric information is directed to a particular direction on the biometric image regardless of the user's position at the time of matching. In this case, the rotation amount estimating unit 12 is only necessary to determine the rotation angle of the biometric information on the input biometric image, for example, in accordance with the registration rotation angle reference table depicted in Table 1. The rotation amount estimating unit 12 notifies the rotation unit 13 of the determined rotation angle.

The rotation unit 13 rotates the biometric information on the biometric image acquired when the biometric information is registered or matched, according to the rotation angle received from the rotation amount estimating unit 12. When rotating the biometric information, the rotation unit 13 may rotate the biometric image itself or rotate only feature points extracted from the biometric image and representing a characteristic structure.

When rotating the biometric image, the rotation unit 13 rotates the coordinates of each of the pixels in the biometric image, for example, around a pixel positioned at the center of the biometric image according to the determined rotation angle using an affine transformation.

When rotating the feature points which have been extracted from the biometric image, the rotation unit 13 can rotate the coordinates of each of the feature points, for example, around a pixel positioned at the center of the biometric image according to the determined rotation angle using the affine transformation.

When the biometric image has been rotated, the rotation unit 13 passes the rotated biometric image to the feature extracting unit 14. Furthermore, when the feature points contained in the template for the biometric information have been rotated at the time of registration, the rotation unit 13 passes the template for the rotated biometric information to the registration unit 15. Additionally, when the feature points extracted from the biometric image acquired at the time of matching or the feature points contained in the template for the registered biometric information stored in the storage unit 5 have been rotated, the rotation unit 13 passes the rotated feature points to the matching unit 15.

The feature extracting unit 14 extracts the features regarding the biometric information captured in the biometric image acquired at the time of registration or matching. For example, the feature extracting unit 14 may extract, as the features, feature points such as vein endings and bifurcations which correspond to a characteristic structure. In this case, the feature extracting unit 14, for example, binarizes the biometric image using a predetermined threshold value to generate a binarized biometric image in which pixels with the vein captured therein have one value, whereas the other pixels have a different value. Then, the feature extracting unit 14 carries out a thinning process on the pixels in the binarized biometric image which have a pixel value corresponding to the vein, to thin a line into which pixels representing the vein are coupled, into, for example, a line with a one-pixel width. The feature extracting unit 14 extracts the vein endings and bifurcations based on the matching between the thinned, binarized biometric image and a template representing a pattern of the vein endings and bifurcations.

When the rotation unit 13 preliminarily has carried out a rotation process on the biometric image, the feature extracting unit 14 passes the extracted features to the registration unit 15 when the biometric information is registered and to the matching unit 16 when the biometric information is matched.

On the other hand, when extracting the features before the rotation process is carried out on the biometric image, the feature extracting unit 14 passes the features to the rotation unit 13. When the biometric image itself or a part of the biometric image is used as a template for the registered biometric information, the feature extracting unit 14 may be omitted.

The registration unit 15 registers the biometric information of each registered user as the registered biometric information. To achieve this, the registration unit 15 generates a template for the biometric information which contains the features received from the feature extracting unit 14. For example, when the features are the feature points in the biometric information, the template contains the coordinates of each feature point. Furthermore, the registration unit 15 acquires the user name of each registered user from the input unit 3. The registration unit 15 assigns each registered user with a user identification number that allows the registered user to be distinguished from the other registered users. The registration unit 15 then associates the user identification number assigned to the registered user with the user name, an identification code representing the body part (in the present embodiment, the right hand or the left hand) carrying the biometric information captured in the biometric image of the registered user, and the template for the biometric information. The registration unit 15 then writes the template for the biometric information to the storage unit 5 together with the user identification number, the user name, and body part identification code of the registered user. Thus, the biometric information of the registered user is registered.

The registration unit 15 may acquire the password of each registered user via the input unit 3. In this case, the registration unit 15 also associates the password with the user identification number of the registered user and then writes the password to the storage unit 5. The user identification number, the user name, and the password of the registered user are each an example of identification information for the registered biometric information which is used to distinguish the registered biometric information from the registered biometric information of the other registered users.

To improve security against leakage of information, the registration unit 15 may encrypt the user name, the user identification number, the password, and the template for the biometric information in accordance with a predetermined encryption scheme and write the encrypted template and the like to the storage unit 5.

FIG. 7 is a diagram depicting an operational flowchart of a biometric information registering process controlled by the computer program executed on the processing unit 6. In this example, after generating the template for the biometric information captured in the biometric image, the processing unit 6 rotates the feature points contained in the template through the rotation angle determined based on the position determination image.

As depicted in FIG. 7, the processing unit 6 acquires a position determination image from the biometric information acquiring unit 4 (step S201). The processing unit 6 then passes the position determination image to the position detecting unit 11 of the processing unit 6. The position detecting unit 11 determines the position of a user to be registered relative to the predetermined reference position (step S202). The position detecting unit 11 then passes the result of the position detection to the rotation amount estimating unit 12 of the processing unit 6.

The rotation amount estimating unit 12 determines a rotation angle needed to make the direction of the biometric information substantially parallel to the vertical direction of the biometric information acquiring unit 4 (step S203). The rotation amount estimating unit 12 notifies the rotation unit 13 of the processing unit 6 of the rotation angle.

Furthermore, the processing unit 6 acquires a biometric image representing the biometric information of the user to be registered (step S204). The processing unit 6 then passes the biometric image to the feature extracting unit 14 of the processing unit 6. The feature extracting unit 14 extracts feature points from the biometric information captured in the biometric image (step S205). The feature extracting unit 14 passes the extracted feature points to the rotation unit 13. The rotation unit 13 rotates the feature points in the biometric information through the rotation angle notified from the rotation amount estimating unit 12 (step S206). The rotation unit 13 then passes the coordinates of the rotated feature points in the biometric information to the registration unit 15.

The registration unit 15 generates a template for the registered biometric information of the corresponding registered user containing the coordinates of the rotated feature points in the biometric information. The registration unit 15 then writes the template to the storage unit 5 together with the user name, the user identification number of the user to be registered and the identification code of the body part carrying the biometric information (step S207).

Then, the processing unit 6 terminates the biometric information registering process. The processing unit 6 may carry out the processing in steps S204 and S205 before executing the processing in steps S201 to S203. Furthermore, after rotating the biometric image acquired in step S204 through the rotation angle determined in step S203, the rotation unit 13 may extract the feature points from the rotated biometric image in step S205. In this case, step S206 is omitted.

When the user identification number of a registered user has received, the matching unit 16 reads the template for the registered biometric information corresponding to the user identification number of the registered user, from the storage unit 5. The matching unit 16 then uses the features extracted from the input biometric image generated at the time of matching and received from the feature extracting unit 14 and the features contained in the template for the registered biometric information, to match the input biometric information, corresponding to the biometric information represented in the input biometric image, with the registered biometric information. The matching unit 16 then determines, as the result of the matching process, the degree of similarity indicating the degree to which the input biometric information is similar to the registered biometric information.

For example, when the feature points corresponding to a characteristic structure are extracted from the biometric information as the features, the matching unit 16 can compute the degree of similarity by checking the number of the feature points extracted from the input biometric image which match the feature points extracted from the registered biometric information.

In this case, for example, the matching unit 16 selects a feature point positioned at or near the center of the input biometric image as a first reference feature point. The matching unit 16 selects one of the feature points extracted from the registered biometric information as a second reference feature point. The matching unit 16 then translates the feature points extracted from the registered biometric information so as to align the second reference feature point with the first reference feature point. Subsequently, the matching unit 16 determines the number of feature points in the registered biometric information which match the feature points in the input biometric information while rotating the feature points extracted from the registered biometric information within a predetermined angular range. The matching unit 16 repeats the above-described processing while changing the combination of the first reference feature point with the second reference feature point to determine the maximum number of feature points in the registered biometric information which match the feature points in the input biometric information.

In the present embodiment, the rotation unit 13 adjusts the direction of the registered biometric information so that the direction of the registered biometric information substantially matches the direction of the input biometric information. Thus, the predetermined angular range may be relatively narrow and be set to, for example, from not less than −15° to not more than +15°. On the other hand, when the right hand or the left hand is the body part carrying biometric information utilized for matching, the angle between the direction of the registered biometric information and the direction of the input biometric information may be from substantially not less than −90° to not more than +90°. Thus, when the directions of the two biometric information not adjusted, the angular range is from not less than −105° to not more than +105° when a margin of about 15° is taken into account. Therefore, the range of rotary scan during the matching according to the present embodiment is one-seventh of the range of rotary scan carried out when the directions of the two biometric information are not adjusted. Setting a narrower angular range as illustrated above allows the matching unit 16 to reduce the amount of computation needed to compute the degree of similarity. Furthermore, the false acceptance rate is also expected to decrease with decreasing the range of rotary scan, and thus, the matching unit 16 can prevent an increase in the false acceptance rate at which, even though the user corresponding to the input biometric information is different from the registered user corresponding to the registered biometric information, the user is mistakenly accepted as the legitimate registered user.

Finally, the matching unit 16 determines the degree of similarity by dividing the maximum value of the number of matched feature points by the total number of feature points extracted from the input biometric information. Thus, in this case, the degree of similarity has a value of 0 to 1, and the value of the degree of similarity approaches 1 as the degree of similarity between the input biometric information and the registered biometric information increases.

Furthermore, when the registered biometric image itself or a part of the registered biometric image is stored in the storage unit 5 as the template for registered biometric information, the matching unit 16 may determine the degree of similarity by carrying out a pattern matching between the input biometric image and the registered biometric image or a part of the registered biometric image. For example, the matching unit 16 computes a normalized cross correlation value while changing the relative position between the input biometric image and the registered biometric image or a part of the registered biometric image. The matching unit 16 then takes the maximum value of the normalized cross correlation value as the degree of similarity. In this case, the matching unit 16 also sets the rotation angle for the registered biometric image relative to the input biometric image to a value within the above-described predetermined angular range.

Furthermore, the matching unit 16 may use many other methods for computing the degree of similarity between the input biometric information and the registered biometric information according to the features extracted from the input biometric information and the registered biometric information. In using any of these methods, the matching unit 16 preferably sets the rotation angle used to align the information representing the position or direction and contained in the template for the input biometric information or the registered biometric information, to a value within the above-described predetermined range. The matching unit 16 notifies the authentication judging unit 17 of the degree of similarity.

When the degree of similarity is equal to higher than an authentication judging threshold value, the authentication judging unit 17 judges that the input biometric information matches the registered biometric information. The authentication judging unit 17 then authenticates the user as the legitimate registered user carrying the corresponding registered biometric information. When the user has been authenticated, the authentication judging unit 17 notifies the processing unit 6 of the result of the authentication. The processing unit 6 then permits the authenticated user to utilize an apparatus in which the biometric authentication apparatus 1 is incorporated or an apparatus to which the biometric authentication apparatus 1 is connected.

On the other hand, when the degree of similarity is lower than the authentication judging threshold value, the authentication judging unit 17 judges that the input biometric information does not match the registered biometric information. In this case, the authentication judging unit 17 does not authenticate the user. The authentication judging unit 17 notifies the processing unit 6 of the result of the authentication indicating that the user has failed to be authenticated. The processing unit 6 then rejects the use, by the user having failed to be authenticated, of the apparatus in which the biometric authentication apparatus 1 is incorporated or an apparatus to which the biometric authentication apparatus 1 is connected. The processing unit 6 may cause the display unit 2 to display a message indicating that the authentication has failed.

It is preferable to set the authentication judging threshold value to such a value that the authentication judging unit 17 succeeds to authenticate the user only when the user is the legitimate registered user. It is also preferable to set the authentication judging threshold value to such a value that the authentication judging unit 17 fails to authenticate the user when the user is a person other than the legitimate registered user. For example, the authentication judging threshold value may be determined by multiplying the difference between the maximum and minimum values that the degree of similarity can take by 0.7 and adding the resulting product to the minimum value of the degree of similarity.

FIG. 8 depicts an operational flowchart of a biometric authentication process controlled by the computer program executed on the processing unit 6.

As depicted in FIG. 8, the processing unit 6 acquires a position determination image from the biometric information acquiring unit 4 (step S301). The processing unit 6 then passes the position determination image to the position detecting unit 11 of the processing unit 6. The position detecting unit 11 determines the position of a user to be registered relative to the predetermined reference position (step S302). The position detecting unit 11 then passes the result of the position detection to the rotation amount estimating unit 12 of the processing unit 6.

The rotation amount estimating unit 12 determines the rotation angle of the direction of biometric information with reference to the matching rotation angle reference table and a body part code specified by the identification information on the user input via the input unit 3 (step S303). The rotation amount estimating unit 12 notifies the rotation unit 13 of the processing unit 6 of the rotation angle. The rotation unit 13 reads a template for the registered biometric information of the corresponding registered user specified by the identification information of the user, from the storage unit 5. The rotation unit 13 then rotates the feature points contained in the template for the registered biometric information through the rotation angle notified by the rotation amount estimating unit 12 so as to direct the registered biometric information substantially parallel to the input biometric information (step S304). The rotation unit 13 then passes the template for the rotated registered biometric information to the matching unit 16.

Furthermore, the processing unit 6 acquires, from the biometric information acquiring unit 4, an input biometric image representing the biometric information of the user to be matched (step S305). The processing unit 6 then passes the input biometric image to the feature extracting unit 14 of the processing unit 6. The feature extracting unit 14 extracts feature points from the input biometric information captured in the input biometric image (step S306). The feature extracting unit 14 passes the feature points extracted from the input biometric image to the matching unit 16 of the processing unit 6.

The matching unit 16 computes the degree of similarity between the input biometric information and the registered biometric information based on the feature points extracted from the input biometric image and the feature points contained in the template for the rotated registered biometric information received from the rotation unit 13 (step S307). The matching unit 16 then passes the degree of similarity together with the user identification number of the registered user to the authentication judging unit 17 of the processing unit 6.

The authentication judging unit 17 judges whether or not the degree of similarity is equal to or higher than the authentication judging threshold value (step S308). When the degree of similarity is equal to or higher than the authentication judging threshold value (step S308—Yes), the authentication judging unit 17 authenticates the user as the legitimate registered user (step S309). On the other hand, when the degree of similarity is lower than the authentication judging threshold value (step S308—No), the authentication judging unit 17 does not authenticate the user (step S310).

After step S309 or step S310, the processing unit 6 terminates the biometric authentication process. The processing unit 6 may carry out the processing in steps S305 and S306 before executing the processing in steps S301 to S304. In this case, the rotation unit 13 may rotate the feature points extracted from the input biometric image through the rotation angle notified by the rotation amount estimating unit 12 so as to direct the input biometric information substantially parallel to the registered biometric information.

As has been explained above, the biometric authentication apparatus according to the present embodiment determines the user's position relative to the predetermined reference position based on the position detection image in which the user is captured. Thus, the biometric information apparatus can estimate the direction of the body part carrying the biometric information relative to the direction of the biometric information acquiring unit and thus estimate the direction of the biometric information captured on the biometric image. Hence, the biometric authentication apparatus can reduce the rotation angle range for alignment between the input biometric information and the registered biometric information at the time of matching. This enables a reduction in the amount of computation in the biometric authentication process and a drop in false acceptance rate.

A biometric authentication apparatus according to a second embodiment will be explained. The biometric authentication apparatus according to the second embodiment is different from the biometric authentication apparatus according to the first embodiment in that the biometric authentication apparatus according to the second embodiment includes a camera to generate a position determination image provided independent of the biometric information acquiring unit. Illustration will be made below for the components of the biometric authentication apparatus according to the second embodiment by focusing the differences from the corresponding components of the biometric authentication apparatus according to the first embodiment.

Figure 9:
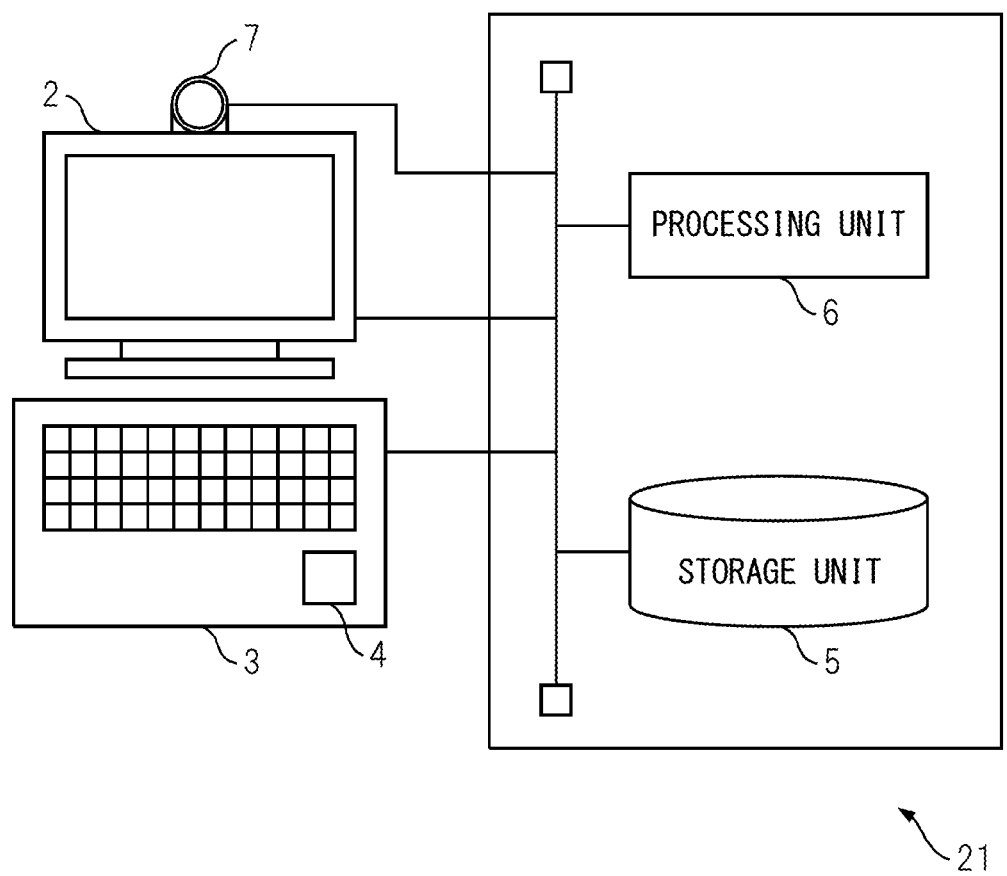
FIG. 9 is a schematic diagram of a configuration of a biometric authentication apparatus according to a second embodiment.

FIG. 9 is a schematic diagram of a configuration of the biometric authentication apparatus according to the second embodiment. As depicted in FIG. 9, a biometric authentication apparatus 21 includes a display unit 2, an input unit 3, a biometric information acquiring unit 4, a storage unit 5, a processing unit 6, and an imaging unit 7. In FIG. 9, the components of the biometric authentication apparatus 21 are denoted by the same reference numerals as those of the corresponding components of the biometric authentication apparatus 1 depicted in FIG. 1.

The imaging unit 7 includes, for example, a two-dimensionally arranged imaging element array and an optical system, as with a so-called web camera. The imaging unit 7 is located at an upper end of the display unit 2 opposite the user facing the display unit 2. Thus, the optical system provided in the imaging unit 7 forms, on the imaging element array, an image of the user's head located at a position where the user can utilize the biometric authentication apparatus 21, for example, located at a position in front of the display unit 2. The imaging unit 7 is connected to the processing unit 6 via a signal line for video signals or a serial bus based on Universal Serial Bus (USB) or the like.

The imaging unit 7 generates a position detection image in which an image of the user's head is captured and outputs the position detection image to the processing unit 6. The processing unit 6 determines user's position relative to a predetermined reference position based on the position detection image generated by the imaging unit 7.

In the present embodiment, the positional relationship between the predetermined reference position and the imaging unit 7 is also fixedly predefined. Thus, the coordinates corresponding to the predetermined reference position on the position detection image can also be predetermined. Moreover, the positional relationship between the predetermined reference position and the biometric information acquiring unit is fixedly predefined, and a distance corresponding to the interval between the predetermined reference position and the front of the biometric information acquiring unit can be predetermined. Hence, the processing unit 6 can identify the coordinates of a position in the position detection image which corresponds to the front of the biometric information acquiring unit, as is the case with the first embodiment. Therefore, the processing unit 6 can determine whether the user is positioned to the right of the biometric information acquiring unit, to the left thereof, or in front thereof by comparing the center of the object area corresponding to the area of the user captured on the position detection image with the position corresponding to the front of the biometric information acquiring unit.

In the present embodiment, the biometric information acquiring unit 4 may be a contact sensor since the biometric information acquiring unit 4 is only necessary to capture the body part carrying the biometric information to be used for the matching.

As have been described above, the biometric authentication apparatus according to the present embodiment includes the imaging unit located opposite the user facing the display unit and can thus reliably take an image of the user of the biometric authentication apparatus. Hence, the biometric authentication apparatus can accurately determine the user's position relative to the predetermined reference position. As a result, the biometric authentication apparatus can accurately estimate the direction of the body part held over the biometric information acquiring unit and carrying biometric information.

The present invention is not limited to the above-described embodiments. For example, when a position determination image is generated and a light source is present behind the user, the light source may be captured on the position determination image. Such the light source on the image may cause the position of the user's head to be mistakenly detected. In view of such matter, the biometric information acquiring unit generates an illuminated image in which a user is captured with an illumination light source turned on and a non-illuminated image in which the user is captured with the illumination light source turned off, and passes these images to the processing unit. The position detecting unit of the processing unit generates a position determination image by subtracting the luminance value of each of the pixels in the non-illuminated image from the luminance value of the corresponding pixel in the illuminated image to obtain a difference image. Thus, in the position determination image, the luminance values of only pixels in an area in which an object reflecting light from the illumination light source is captured are high, and the other pixels have a value of about zero. Consequently, the position detecting unit can accurately determine the user's position using such a position determination image.

The body part of a user utilized to determine the user's position and captured in the position determination image is not limited to the head but may be a body part other than a body part carrying the biometric information used for the matching, for example, may be any truncal body part.

The processing unit may set the direction of the registered biometric information in the template for the registered biometric information to the direction of the registered biometric information captured on the biometric image as-is. In this case, for example, the rotation angle determined by the rotation amount estimating unit is stored together with the template for the registered biometric information. The rotation unit may rotate the registered biometric information through the rotation angle determined based on the input biometric information on the biometric image generated at the time of matching plus the rotation angle determined at the time of registration.

Moreover, the biometric authentication apparatus and the biometric authentication method disclosed herein are applicable to various kinds of apparatus or systems that perform biometric authentication between user biometric information and preregistered biometric information in order to permit the user to perform a desired operation. Such apparatus or systems include, for example, a computer system in which one or more terminals are connected to a server via a communication network. In this case, each terminal is equipped with a biometric information acquiring unit, and the biometric image acquired by the biometric information acquiring unit is transmitted to the server. Then, the server carries out the biometric image registration or biometric authentication process by implementing the functions of the processing unit according to any one of the above embodiments.

Moreover, a processor in each terminal may have the functions of the position detecting unit and the feature extracting unit, included in the functions of the processing unit according to each of the above-described embodiments. On the other hand, a processor in the server may have the functions of the rotation amount estimating unit, the rotation unit, the registration unit, the matching unit, and the authentication judging unit. This enables a reduction in processing reads on the processor in the server.

Furthermore, a computer program with instructions causing a computer to implement the functions of the processing unit according to each of the above-described embodiments may be provided by being recorded in a recording medium such as a magnetic recording medium or an optical recording medium.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A biometric authentication apparatus comprising:
a biometric information acquiring device which captures an image of a first body part of a user to obtain acquired biometric information of the first body part;
a storage device which stores a reference table representing a relationship between a user position relative to a reference position and a rotation angle of the acquired biometric information of the first body part, and registered biometric information of the first body part of each registered user; and
a processor configured to:
determine the user position relative to the reference position based on a position of a second body part of the user, different from the first body part, on an image in which the second body part appears;
determine the rotation angle of the acquired biometric information of the first body part corresponding to the user position with reference to the reference table;
rotate the registered biometric information of the first body part or the acquired biometric information of the first body part according to the rotation angle; and
compare the registered biometric information of the first body part and the acquired biometric information of the first body part to each other by rotating at least either the registered biometric information or the biometric information within a predetermined rotation angle range to align the registered biometric information and the biometric information with each other, and calculating a degree of similarity obtained when the registered biometric information and the biometric information best match each other, and the predetermined rotation angle range is set narrower than an expected maximum range of the rotation angle.

2. The biometric authentication apparatus according to claim 1, wherein the biometric information acquiring device generates the image in which the second body part appears by capturing the image of the second body part before or after the first body part carrying the biometric information is held over the biometric information acquiring device.

3. The biometric authentication apparatus according to claim 1, further comprising an imaging unit which captures the image of the second body part of the user located at a position where the user is able to utilize the biometric authentication apparatus, to generate the image in which the image of the second body part appears.

4. The biometric authentication apparatus according to claim 1, wherein the determining the user position determines whether the user is positioned to right or left of the biometric information acquiring device based on the user position relative to the reference position, and
the determining of the rotation angle sets the rotation angle to different values depending on whether the user is positioned to the right or left of the biometric information acquiring device.

5. The biometric authentication apparatus according to claim 1, wherein the first body part is the user's right hand or left hand, and the second body part is the user's head.

6. A biometric authentication method comprising:
capturing an image of a first body part of a user to obtain acquired biometric information of the first body part by a biometric information acquiring device;
capturing an image of a second body part of a user different from the first body part;
determining a user position relative to a reference position based on a position of the second body part in the image of the second body part, by a processor;
determining a rotation angle of the acquired biometric information of the first body part corresponding to the user position with reference to a reference table representing a relationship between the user position relative to the reference position and the rotation angle for the acquired biometric information of the first body part, by the processor;
rotating registered biometric information of the first body part or the acquired biometric information of the first body part according to the rotation angle, by the processor; and
comparing the registered biometric information of the first body part and the acquired biometric information of the first body part to each other, by the processor, by rotating at least either the registered biometric information or the biometric information within a predetermined rotation angle range to align the registered biometric information and the biometric information with each other, and calculating a degree of similarity obtained when the registered biometric information and the biometric information best match each other, and the predetermined rotation angle range is set narrower than an expected maximum range of the rotation angle.

7. The biometric authentication method according to claim 6, wherein the comparing the registered biometric information of the first body part and the biometric information of the first body part to each other aligns the registered biometric information and the biometric information with each other by rotating at least either the registered biometric information or the biometric information within a predetermined rotation angle range, and calculates a degree of similarity obtained when the registered biometric information and the biometric information best match each other, and the predetermined rotation angle range is set narrower than an expected maximum range of the rotation angle.

8. The biometric authentication method according to claim 6, wherein the determining of the user position determines whether the user is positioned to right or left of the biometric information acquiring device based on the user position relative to the reference position, and
the determining of the rotation angle sets the rotation angle to different values depending on whether the user is positioned to the right or left of the biometric information acquiring device.

9. The biometric authentication method according to claim 6, wherein the first body part is the user's right hand or left hand, and the second body part is the user's head.

10. A non-transitory computer-readable recording medium having recorded thereon a biometric authentication computer program that causes a computer to execute a process comprising:
determining a user position relative to a reference position based on a position of a second body part of a user, different from a first body part of the user, in an image of the second body part;
determining a rotation angle of acquired biometric information of the first body part of the user obtained by capturing an image of the first body part of the user corresponding to the user position with reference to a reference table representing a relationship between the user position relative to the reference position and the rotation angle for the acquired biometric information of the first body part;
rotating registered biometric information of the first body part or the acquired biometric information of the first body part, according to the rotation angle; and
comparing the registered biometric information of the first body part and the acquired biometric information of the first body part to each other by rotating at least either the registered biometric information or the biometric information within a predetermined rotation angle range to align the registered biometric information and the biometric information with each other, and calculating a degree of similarity obtained when the registered biometric information and the biometric information best match each other, and the predetermined rotation angle range is set narrower than an expected maximum range of the rotation angle.

* * * * *